(12) United States Patent
Van Nieuwstadt et al.

(10) Patent No.: US 11,181,057 B2
(45) Date of Patent: Nov. 23, 2021

(54) SYSTEM AND METHOD FOR INJECTING FLUID

(71) Applicant: Ford Global Technologies, LLC, Dearborn, MI (US)

(72) Inventors: Michiel J. Van Nieuwstadt, Ann Arbor, MI (US); Paul Tennison, West Bloomfield, MI (US); Jim Bromham, Trowbridge (GB); Aaron Oakley, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/774,438

(22) Filed: Jan. 28, 2020

(65) Prior Publication Data

US 2021/0231067 A1    Jul. 29, 2021

(51) Int. Cl.
| | |
|---|---|
| F02D 41/00 | (2006.01) |
| F01N 3/08 | (2006.01) |
| F01N 3/029 | (2006.01) |
| F01N 3/10 | (2006.01) |
| F01N 3/20 | (2006.01) |

(52) U.S. Cl.
CPC ....... *F02D 41/0055* (2013.01); *F01N 3/0293* (2013.01); *F01N 3/0835* (2013.01); *F01N 3/103* (2013.01); *F01N 3/2066* (2013.01); *F01N 2560/07* (2013.01); *F01N 2610/02* (2013.01)

(58) Field of Classification Search
CPC .. F01N 2560/07; F01N 2610/02; F01N 3/103; F01N 3/2066; F01N 3/0293; F01N 3/0835; F02D 41/0055
See application file for complete search history.

(56) References Cited

U.S. PATENT DOCUMENTS

| | | | |
|---|---|---|---|
| 7,159,551 B2 | 1/2007 | Cecur et al. | |
| 7,404,383 B2 | 7/2008 | Elendt | |
| 7,938,101 B2 | 5/2011 | Cinpinski et al. | |
| 8,240,277 B1* | 8/2012 | Michikawauchi | F02D 19/027 |
| | | | 123/1 A |
| 8,281,578 B2 | 10/2012 | Upadhyay et al. | |
| 9,605,603 B2 | 3/2017 | Glugla et al. | |
| 2007/0079809 A1* | 4/2007 | Oono | F02D 41/3845 |
| | | | 123/456 |
| 2011/0265455 A1* | 11/2011 | Hirota | F02D 19/0644 |
| | | | 60/285 |
| 2015/0081195 A1 | 3/2015 | Berkemeier et al. | |
| 2016/0032800 A1* | 2/2016 | Bisaiji | F01N 3/0871 |
| | | | 60/286 |
| 2016/0084206 A1* | 3/2016 | Noda | F02D 21/08 |
| | | | 123/568.21 |

* cited by examiner

*Primary Examiner* — Brandon D Lee
(74) *Attorney, Agent, or Firm* — Geoffrey Brumbaugh; McCoy Russell LLP

(57) ABSTRACT

Methods and systems for operating an engine with a pump that is driven via the engine are described. In one example, start of opening of an injector that supplies a fluid to an engine exhaust system is timed based on a period of the pump so that the output of the fluid injector may be repeatable in the presence of fluid pressure oscillations that are periodic with pump rotation.

20 Claims, 4 Drawing Sheets

SYSTEM AND METHOD FOR INJECTING FLUID

BACKGROUND/SUMMARY

A vehicle may include a variety of fluids that may be used from time to time during the course of vehicle operation. The fluids may be injected via an injector that opens for an amount of time to deliver the fluid to its destination. For example, the fluid may be a hydrocarbon fuel that is injected to an exhaust system to facilitate raising a temperature of a catalyst. The catalyst may be an oxidation catalyst that oxidizes hydrocarbons. In other examples, the fluid may be reductant (e.g., $NH_3$) that is delivered to a selective catalytic reduction (SCR) catalyst. The SCR catalyst may reduce Nitrogen oxides to $N_2$ and $H_2O$. If too much fluid is injected via the injector, a portion of the fluid may be wasted. If too little fluid is injected, a reaction that is desired by injecting the fluid may not be realized, or the reaction that results from injecting the fluid may be insufficient to produce desired results. Therefore, it may be desirable to provide a way of improving the accuracy of the injection of a fluid.

The inventors herein have recognized the above-mentioned disadvantages and have developed an engine operating method, comprising: adjusting a start of injection timing of a fluid according to a half period of a pump that is mechanically rotated via an engine.

By adjusting a start of opening timing of a fluid injector according to a half period of a pump or of the fluid pressure it generates, it may be possible to increase accuracy of an amount of fluid injected to an exhaust system or to another location. The period of the fluid pump may be indicative of pressure of a fluid that is delivered via the pump, and timing of injection by the injector may be adjusted so that the injector injects fluid at an average fluid pressure rather than a time varying fluid pressure so that the amount of fluid injected may be accurate and consistent.

The present description may provide several advantages. In particular, the approach may improve operation of emissions devices in an exhaust system. In addition, the approach may improve accuracy of an amount of fluid that is injected to an exhaust system, even when the pressure of the fluid being injected oscillates. Further, the approach may improve consistency from one injection of a fluid to a next injection of the fluid.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to operating an engine that includes a pump that is coupled to and driven via the engine. The pump may output a fluid that has a pressure that varies or oscillates as a period of the pump varies. The pressure of fluid that is output by the pump may be repeatable or nearly repeatable for each cycle (e.g., one complete rotation of the pump) over a time period, such that the pressure of the fluid is periodic and such that the pressure output by the pump repeats or nearly repeats every period of the pump (e.g., the amount of time it takes for the pump to rotate through one complete cycle of the pump). An opening timing of an injector of the fluid may be adjusted according to or in response to a period of the pump or a period of the pressure oscillation so that the injector injects fluid at an average pressure that is equal to the average pressure that is output from the pump. Consequently, a bias in fluid pressure at the times of injection of the fluid may be avoided, thereby increasing the accuracy and repeatability of injecting a fluid. In one example, the engine system may be of the type shown in FIG. 1. Alternatively, the engine system may be a spark ignited engine. Pressure output of a pump may exhibit periodicity as shown in FIG. 2. A time varying pressure may be injected at timings shown in FIG. 3 to avoid biasing or introducing an offset to an amount of fuel that is injected. A method for injecting a fluid is shown in FIG. 4. The method may include injecting a fluid to an exhaust system of the type shown in FIG. 1.

Figure 1:
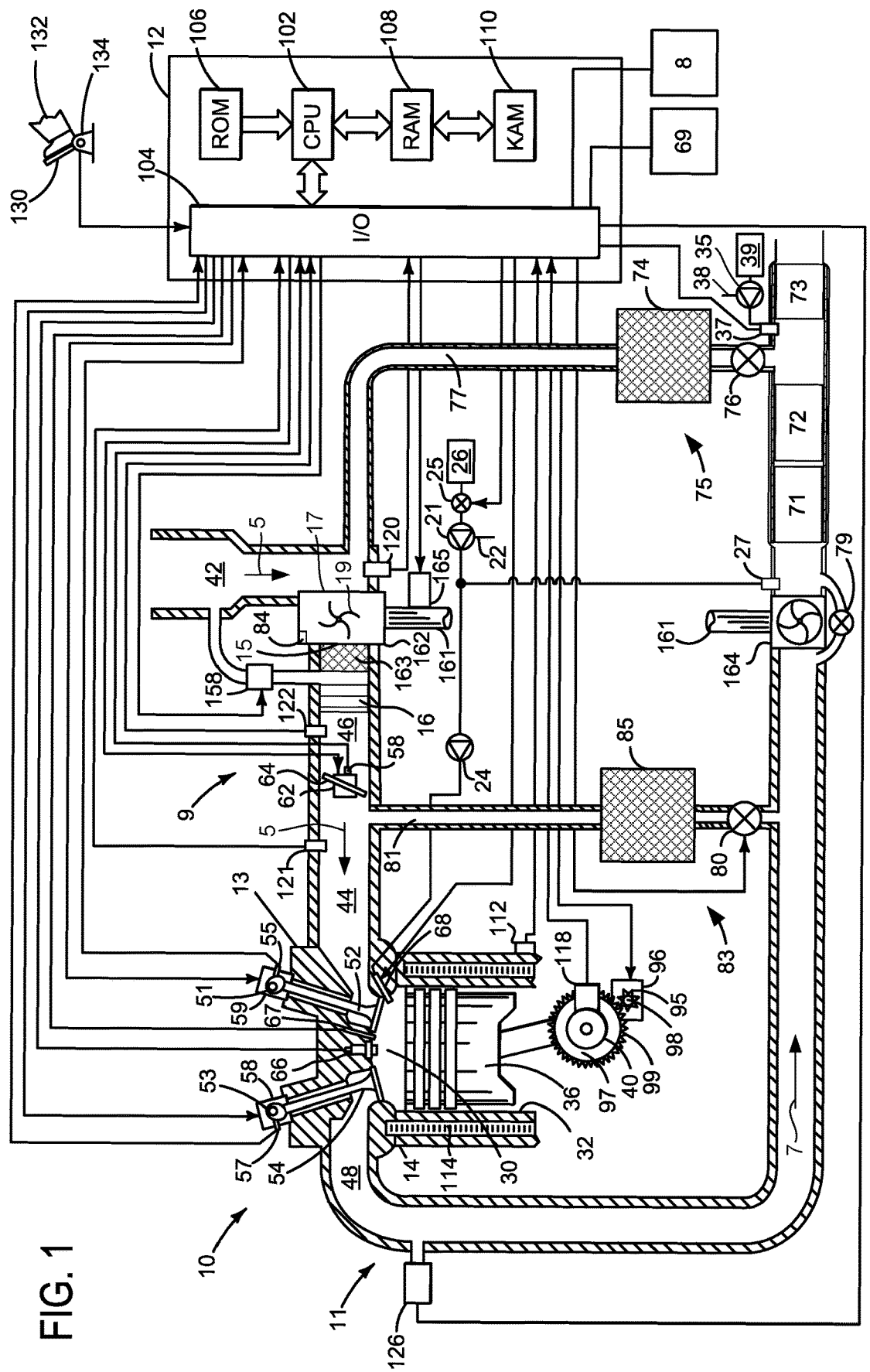
FIG. 1 shows a detailed schematic depiction of an example engine.
Figure 2:
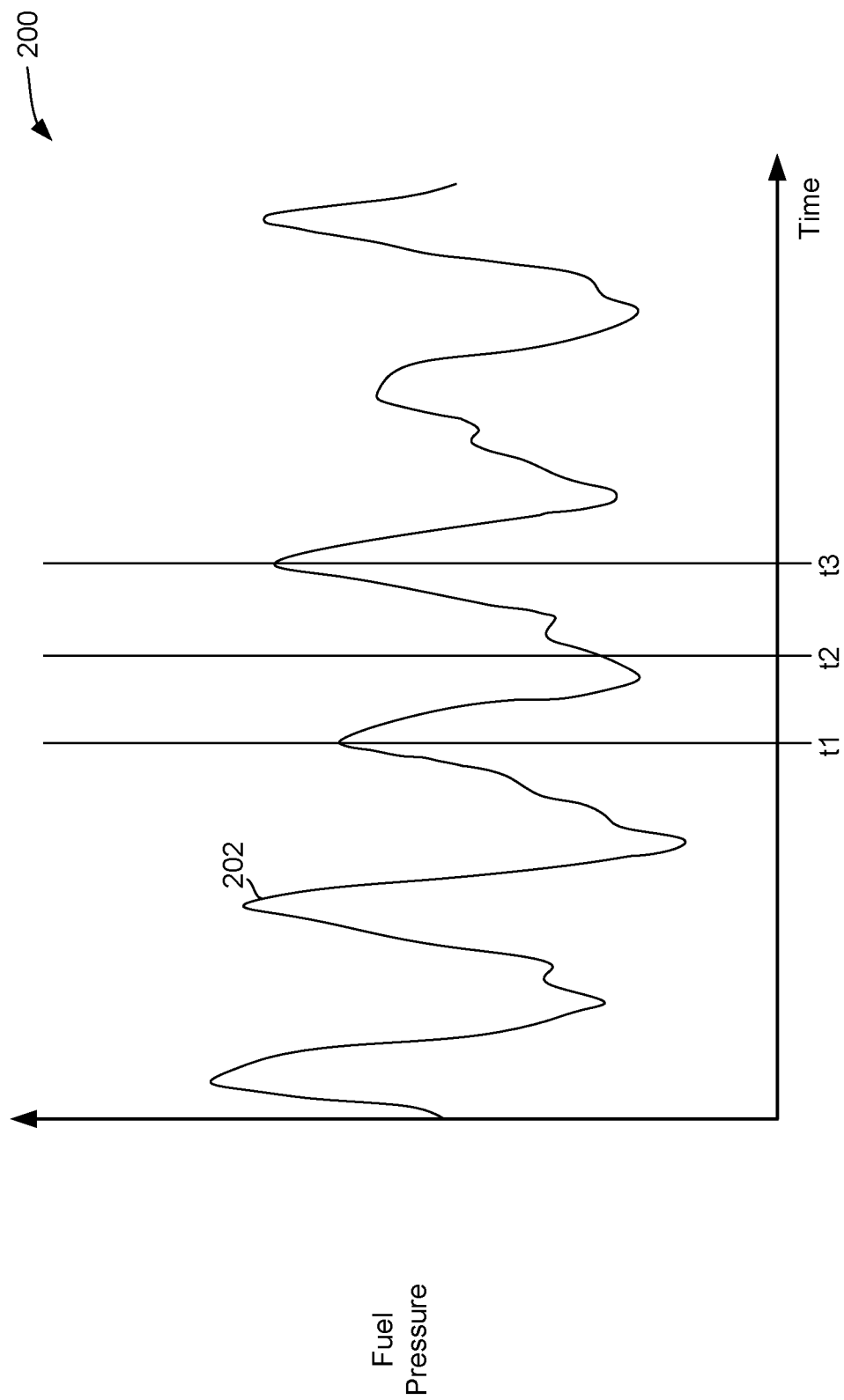
FIG. 2 shows an example pressure waveform of a fluid that may be injected to an exhaust system of an engine.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller. Engine 10 may be a diesel or petrol engine.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, low pressure fuel pump 21, high pressure fuel pump 24, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump. Low pressure fuel pump 21 includes a shaft 22 that may be mechanically coupled to crankshaft 40 or a camshaft (e.g., 53 or 51) so that low pressure fuel pump 21 rotates at a speed that is a multiple (e.g., an integer or fractional multiple) of a speed of engine 10. Low pressure fuel pump 21 may be coupled to crankshaft 40 or a camshaft via a belt in some examples. Low pressure fuel pump 21 may supply pressurized fuel to exhaust system 11 at a location that is upstream of catalyst 71 to increase a temperature of catalyst 71. Fuel may be injected upstream, of catalyst 71 via injector 27.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started. Compressor speed may be adjusted via adjusting a position of compressor recirculation valve 158 or waste gate 79. Exhaust gases can pass through turbine 164 supplying little energy to rotate turbine 164 when vanes are in an open position. Exhaust gases may pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Optional electric machine 165 is also shown coupled to shaft 161. Optional electric machine 165 may rotate compressor 162 when engine 10 is not rotating, when engine 10 is rotating at low speed (e.g., cranking speed such as 250 RPM), or when exhaust energy is low to provide additional boost. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and electric machine 165. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via optional pressure sensor 67, alternatively or in addition, sensor 67 may also sense cylinder temperature.

Exhaust system 11 includes emissions device 71, which may be an oxidation catalyst, and it may be followed by a diesel particulate filter (DPF) 72 and a selective catalytic reduction (SCR) catalyst 73, in one example. In another example, DPF 72 may be positioned downstream of SCR 73. Exhaust flows in the direction of arrow 7. A non-hydrocarbon reductant (e.g., $NH_3$, $H_2O$, or $2(NH_2)CO$) may be stored in a tank or reservoir 39. The non-hydrocarbon reductant may be pumped to an injector 37 that is located upstream of the SCR 73 via pump 35 according to the direction of exhaust flow. Pump 35 may include a shaft 38 that may be driven by and mechanically coupled to crankshaft 40 or a camshaft (e.g., 51/53). Pump 35 may be a belt driven pump in some examples.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

The system of FIG. 1 provides for an engine system, comprising: a diesel engine including a compressor; an exhaust system coupled to the diesel engine, the exhaust system including a catalyst; a fluid injector positioned upstream of the catalyst in the exhaust system; a pump mechanically coupled to a shaft of the diesel engine, the pump in fluid communication with the fluid injector; and a controller including executable instructions stored in non-transitory memory to cause the controller to open the fluid injector for less than a haft period of the pump or less than a half period of a fluid pressure oscillation of the fluid being injected and adjust a start of injecting the fluid according to a half period of the pump or the fluid pressure oscillation. The engine system further comprises additional instruction to adjust the start injection of fluid as a function of an integer multiple of the half period of the pump or the fluid pressure oscillation. The engine system includes where the catalyst is an oxidation catalyst and where the fluid is a hydrocarbon. The engine system includes where the catalyst is a selective reduction catalyst and where the fluid is a reductant other than a hydrocarbon. The engine system includes where the reductant other than the hydrocarbon is $NH_3$. The engine system includes where the pump rotates at a speed that is an integer multiple of speed of the engine. The engine system further comprises additional instructions to not open the fluid injector while fuel is being injected to the engine.

Referring now to FIG. 2, an example fluid pressure waveform trace 202 that may be output from a pump that is driven via an engine is shown. However, in some examples, the pump may be driven via an electric machine. Plot 200 includes a vertical axis that represents fuel pressure and a horizontal axis that represents time. The fuel pressure increases in the direction of the vertical axis arrow. Time increases from the left side of the plot to the right side of the plot. Vertical lines at times t1-t3 represent times of interest during the fluid pumping sequence.

Fluid pressure trace 202 has a period that is indicated by the time interval between time t1 and time t3. Thus, the fluid pressure cycle shown in trace 202 may begin at time t1 and end at time t3 where another fluid pressure cycle begins. It may be observed that the fluid pressure trace 202 decreases shortly after time t1 and then it begins to increase before reaching time t3 so that the cycle may repeat. A half period duration is shown between time t1 and time t2 Likewise, a half period duration is indicated between time t2 and time t3. The frequency of pressure trace 202 may be expressed as $F=1/P$, where F is the frequency and P is the period of trace 202.

It may be observed that the average fluid pressure of trace 202 may vary over time and within an individual cycle of the pump. The fluid pressure may vary due to a change in a speed of the pump. Further, it may be observed that if injection of a fluid occurs within a first half period of one pump cycle, without further injection during the second half period of the pump cycle, the amount of the fluid injected may be biased according to the pressure in the first half period of the pump cycle. However, if a first injection of fluid occurs during the first half period of the pump cycle and a second injection of fluid occurs during the second half period of the pump cycle, then the amount of fluid injected may be a function of the average pressure of pressure trace 202 during the pump cycle.

It should be noted that the start of injection timings relative to a beginning of half a fluid pressure cycle should be equal for a first half period injection and a second half period injection during the pressure oscillation period for fluid injection to be at an average pressure of the fluid pressure. In addition, the duration of injection timings in the first half period and the second half period of the pressure oscillation period should be equal for fluid injection to be at an average pressure of the fluid pressure.

Figure 3:
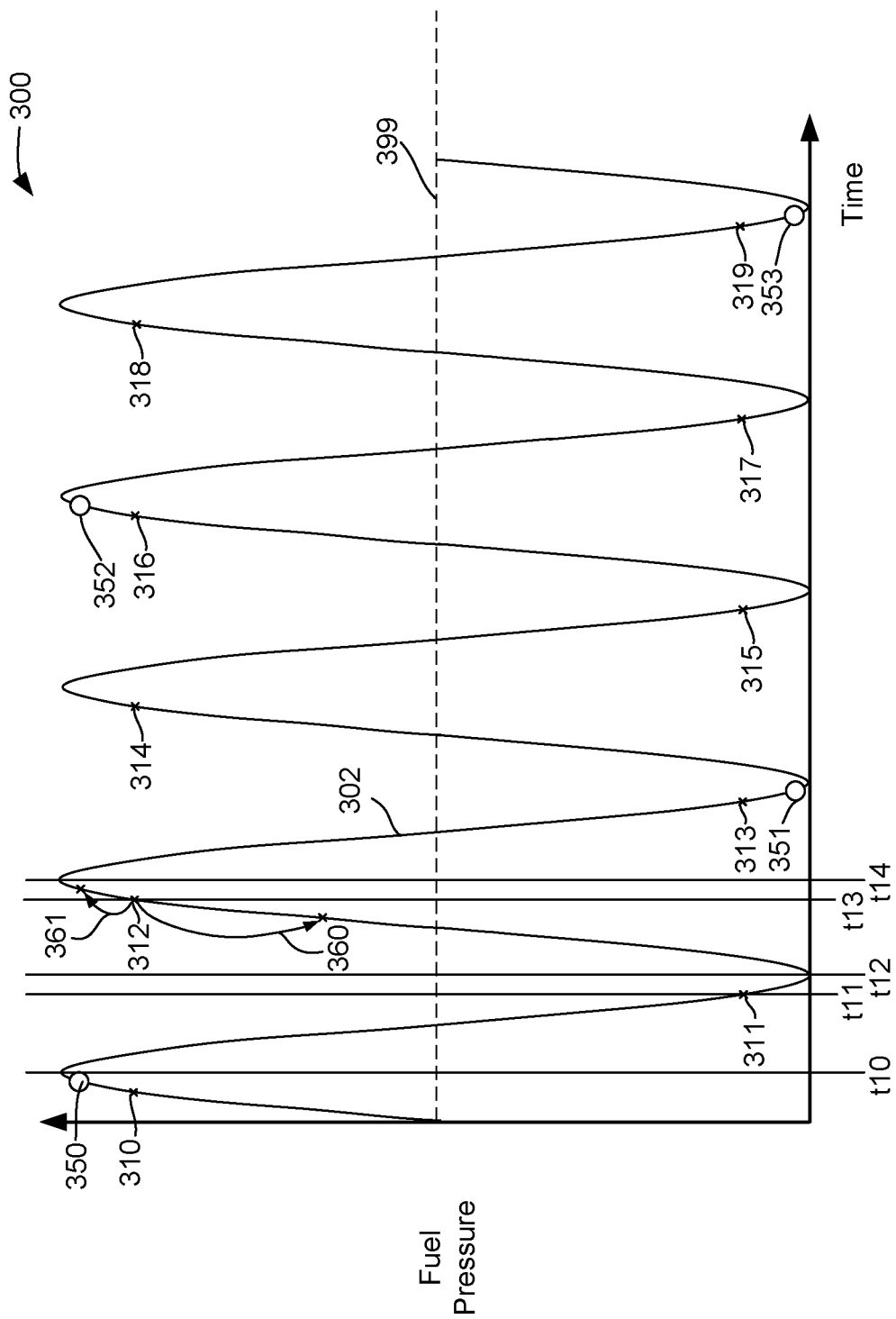
FIG. 3 shows example injection timing of a fluid relative to pressure of the fluid according to the method of FIG. 4.
Figure 4:
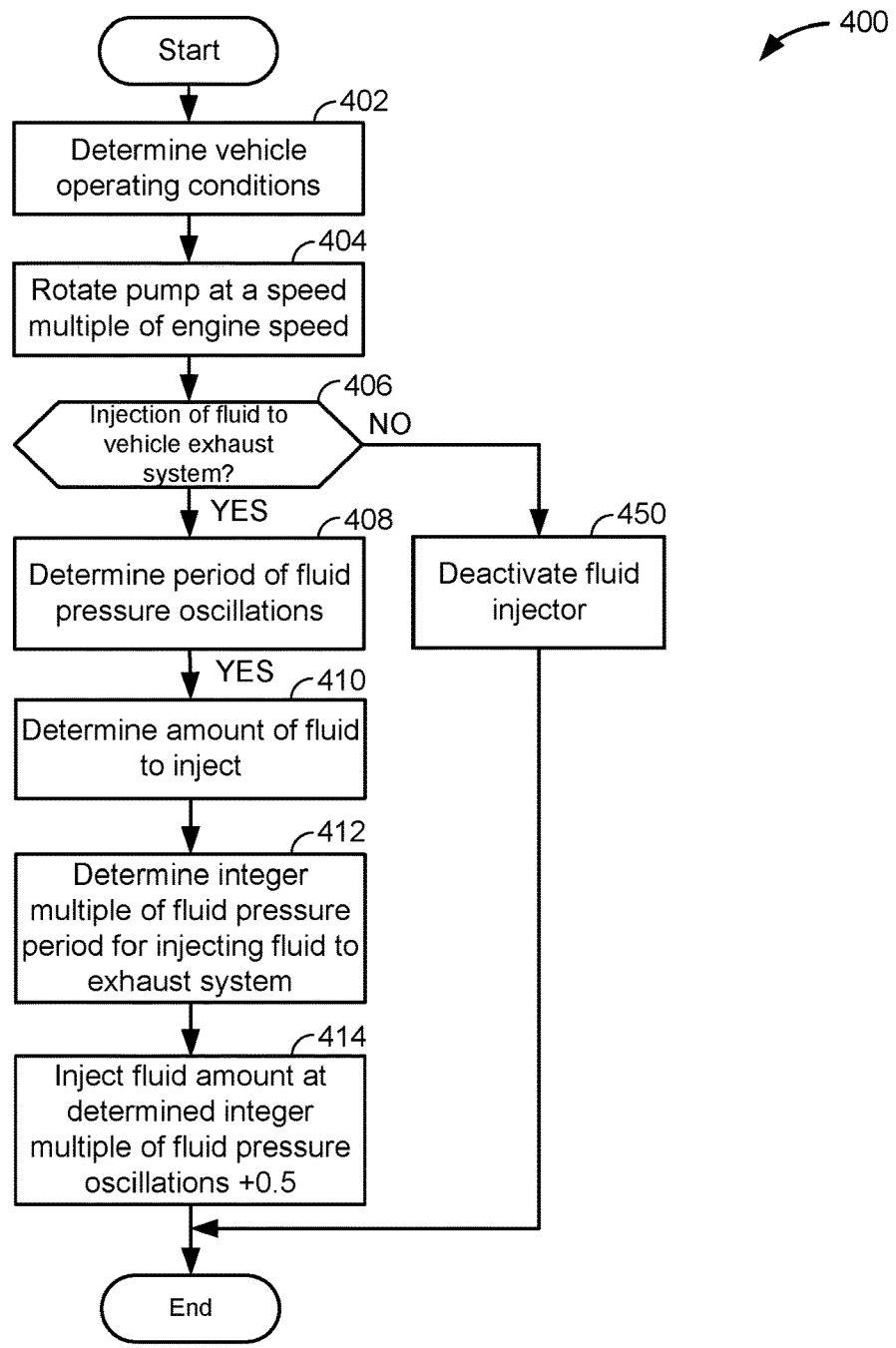
FIG. 4 shows an example flowchart of a method for injecting a fluid.

Referring now to FIG. 3, example injection timing of a fluid relative to pressure of the fluid is shown. The injection of fluid is performed according to the method of FIG. 4. Plot 300 includes a vertical axis that represents fuel pressure and a horizontal axis that represents time. The fuel pressure increases in the direction of the vertical axis arrow. Time increases from the left side of the plot to the right side of the plot. Trace 302 represents pressure of a fluid that is delivered to an engine exhaust system or other location via a pump that is rotated. Vertical lines at times t10-t14 represent times of interest during the fluid pumping sequence. Horizontal line 399 represents the average fluid pressure of fluid pressure trace 302.

A period of trace 302 is indicated between time t10 and time t14. Trace 302 repeats several times after time t14. Fluid injections every half period of trace 302 are indicated by x's at 310-319. Fluid injections for every 1.5 periods of trace 302 are indicated by O's at 350-353. The timing of half period injections and one and one half period injections relative to the phase of fluid pressure trace 302 is immaterial so long as the duration of the injections is less than one half period of pressure trace 302. For example, as shown by arrows 360 and 361, start of injection 312 may be retarded as indicated by arrow 360 or it may be advanced as indicated by arrow 361 relative to pressure trace 302 without changing an amount of fluid injected over a period of pressure trace 302 so long as the injection duration is less than one half a period of fluid pressure trace 302 and so long as timing of a second injection over the integer multiple of fluid pressure oscillations is adjusted by a similar amount. For example, if start of a fluid pressure period begins at time t10 and injection timing at 312 is advanced to 360, then timing of injection at 311 has to be advanced by a same amount so that fluid at the average pressure is injected.

In this example, a period of trace 302 starts at time t10 and it ends at time t14. A start timing of a first fluid injection for half period selected injections occurring during the period begins at time t11 and it may end at time t12. A start of a second fluid injection for half period selected injections occurring during the period begins at time t13 and it may end at time t14. Thus, the amount of time from the start of the pressure period (t10) to time t11 is equal to the amount of time from the half period time (t12) to time t13 so that fluid at the average pressure is injected. It may be observed that the average fluid pressure output from the pump when fluid is injected between times t11-t12 and times t13-t14 is equal to the average pressure 399 of fluid pressure trace 302. The lower fluid pressure between time t11 and t12 is offset by the higher fluid pressure between time t13 and time t14, which makes the average fluid injection pressure equal to that indicated by line 399.

Similarly, when fluid injection timing is extended to 1.5 periods of fluid pressure trace 302, the average fluid injection pressure is equal to the average fluid injection pressure indicated by line 399. For example, the higher fluid pressure at injection 350 is offset by the lower fluid injection pressure at injection 351. Consequently, fluid injections that occur during higher pressure portions of fluid pressure trace 302 are offset by fluid injections that occur during lower pressure portions of fluid pressure trace 302 so that the average fluid injection pressure is equal to the average pressure of fluid pressure trace 302. This aspect of the fluid injection timing holds true whether the start of injection timing is advanced or retarded during a cycle of the pump and fluid pressure trace 302, so long as the injection durations are less than one half period, so long as injections are at one half a period plus an integer multiple of the fluid pressure period, and so long as a fluid injection is performed each selected integer multiple of a fluid pump period.

Referring now to FIG. 4, a method for operating a vehicle is shown. The method of FIG. 4 may be stored as executable instructions in non-transitory memory in systems such as shown in FIG. 1. The method of FIG. 4 may be incorporated into and may cooperate with the systems of FIG. 1. Further, at least portions of the method of FIG. 4 may be incorporated as executable instructions stored in non-transitory memory while other portions of the method may be performed via a controller transforming operating states of devices and actuators in the physical world. The controller may employ actuators of the vehicle system to adjust vehicle operation, according to the method described below. Further, method 400 may determine selected control parameters from sensor inputs.

At 402, method 400 determines vehicle operating conditions. Vehicle operating conditions may include but are not limited to engine temperature, accelerator pedal position, ambient temperature, catalyst temperature, emissions device loading, driver demand torque, engine air flow rate, and engine speed. Vehicle operating conditions may be determined via vehicle sensors and the engine controller described in FIG. 1. Method 400 proceeds to 404.

At 404, method 400 rotates a fluid pump at a multiple of a speed of a shaft of the engine. The fluid pump may be coupled to the engine crankshaft or an engine camshaft via a belt, chain, or gear. The fluid pump may supply a fluid to the engine's exhaust system. For example, the pump may supply a non-hydrocarbon to a selective catalyst reduction catalyst. Alternatively, the pump may supply a hydrocarbon to a catalyst (e.g., an oxidation catalyst) to increase a temperature of the catalyst. Method 400 proceeds to 406.

At 406, method 400 judges if an injection of a fluid via the fluid pump is desired. In one example, method 400 may judge that injection of a fluid is desired if less than a first threshold amount of reductant is stored within a selective reduction catalyst (SCR). Method 400 may judge that injection of the fluid may not be desired if greater than a second threshold amount of reductant is stored within the SCR. The amount of reductant stored in the SCR may be determined via a model as described in U.S. Pat. No. 8,281,578, which is hereby fully incorporated by reference for all purposes. Method 400 may also judge that injection of fluid is desired if a temperature of a catalyst is less than a third threshold temperature. For example, diesel fuel may be injected to an oxidation catalyst to increase catalyst temperature, thereby increasing catalyst efficiency. Method 400 may judge that injection of fluid is not desired if a temperature of the catalyst is greater than a fourth threshold temperature. If method 400 judges that injection of a fluid is desired, the answer is yes and method 400 proceeds to 408. Otherwise, if method 400 judges that injection of fluid is not desired, the answer is no and method 400 proceeds to 450.

At 450, method 400 deactivates the injector that injects fluid to the engine exhaust system or other vehicle location. Flow of fluid to the engine exhaust system or other device is inhibited when the injector is deactivated. Method 400 proceeds to exit.

At 408, method 400 determines a period of oscillations of fluid that is supplied by the pump and injected via an injector. In one example, the period of oscillations may be determined via determining engine speed and converting the engine speed to a period of the pump that is supplying the fluid to the engine exhaust system. For example, if engine speed is 1000 RPM and the pump produces one pressure cycle for each engine revolution, the pump period may be determined as follows: 1/(1000 Revolutions/minute*1 cycle/revolution*1 minute/60 seconds)=0.06 seconds/cycle. The engine speed may be determined via an engine speed or position sensor. The pump speed may be determined by multiplying the engine speed by a gear/pulley ratio between the engine and the pump. The frequency of pressure of the fluid that is pumped may be determined by taking the inverse of the pump speed multiplied by the number of pump cycles per pump revolutions. Alternatively, a period of the fluid pressure may be determined via monitoring the fluid pressure and processing the fluid pressure via a Fourier transform. Method 400 proceeds to 410 after determining the period of oscillations of the fluid being pumped to the injector.

At 410, method 400 determines an amount of fluid to inject via the injector. In one example, method 400 may determine an amount of fluid to inject by subtracting an amount of fluid that is stored in an exhaust system device from a storage capacity of the exhaust system device. For example, if an SCR may store X grams of $NH_3$ and Y grams of $NH_3$ are presently stored in the SCR, method 400 may determine to inject X-Y grams of $NH_3$ to the SCR. In another example, method 400 may determine an amount of fluid to inject based on a difference between a desired temperature of an exhaust system device and actual temperature of the exhaust system device (e.g., a temperature differential). In one example, a table or function may be referenced via the temperature differential, and the table or function outputs an amount of fluid (e.g., diesel) to inject. Values in the table or function may be empirically determined via injecting amounts of fluid and determining a temperature increase that results from injecting the fluid. Method 400 proceeds to 412 after determining an amount of fluid to inject via the pump and the injector.

At 412, method 400 determines an integer multiple (e.g., 0 to N, where N is a whole real number) of the fluid pressure period for injecting fluid via the fuel injector and the pump. In one example, the integer multiple may be a function of an engine air flow rate so that the rate of fluid that is injected does not exceed a rate at which the fluid may be utilized efficiently. For example, if the engine air flow rate is low, the value of the integer multiple may be increased so that less than a threshold amount of fuel may be injected to the oxidation catalyst during a predetermined time interval so that the air-fuel ratio within the oxidation catalyst is not richer than may be desired. In one example, the value of the integer multiple may be zero when a greater amount of fuel may be injected in a short amount of time due to a high engine air flow rate. The integer multiple may be larger (e.g., 20) when the amount of fuel that may be injected in a period of time is smaller due to a low engine air flow rate. The integer multiple values may be determined via adjusting integer values in the table or function as a function of engine air flow rate and monitoring tailpipe emissions.

The amount of time that the injector is open each time the injector is opened may be a predetermined amount of time (e.g., 5 milliseconds), or the amount of time that the injector is open may be a function of the integer multiple and the amount of fluid to inject. Method 400 proceeds to 414.

At 414, method 400 injects fluid via the injector and the pump. The starting timing of injecting fluid is based on the integer multiple of the fluid pressure oscillation plus 0.5 (e.g., a half period). For example, if the integer multiple is zero and the fluid pressure oscillation period is 60 milliseconds, the fuel injector may be opened twice every 60 milliseconds for less than 30 milliseconds (0+0.5)=0.5 each time it is opened. If the integer multiple value is one, the fluid may be started to be injected every 1+0.5=1.5 periods of the fluid oscillation. Thus, if the fluid pressure oscillation period is 60 milliseconds, the injector may start to open every 90 milliseconds so that the injector opens when fluid pressure is increasing and when fluid pressure is decreasing. The fluid injection duration (e.g., time that the fluid injector is open) for each injection may be less than one half of a period of the fluid pressure oscillation (e.g., one half a period of the pump if the pump provides one pressure pulse per pump revolution) so that the amount of fluid injected remains consistent. Method 400 injects the amount fluid determined at 410 by injecting the fluid each integer multiple of the fluid pressure oscillation period plus a value of 0.5 until the amount of fluid determined at 410 is injected. Method 400 proceeds to exit after injecting the fluid.

In this way, a fluid injector may be opened and closed as a function of a period of a fluid pressure so that accurate and consistent amounts of fluid may be injected. The fluid may be injected to an exhaust system or to another device.

Thus, the method of FIG. 4 provides for an engine operating method, comprising: adjusting a start of injection timing of a fluid according to a half period of a pump that is mechanically rotated via an engine. The engine method includes where the fluid is a hydrocarbon. The engine method includes where the fluid is a reductant other than a hydrocarbon. The engine further comprises injecting the fluid into an exhaust system. The engine method further comprises injecting the fluid into the exhaust system upstream of an oxidation catalyst. The engine further comprises injecting the fluid into the exhaust system upstream of a selective reduction catalyst. The engine method includes where the engine is a turbo-charged diesel engine that includes an exhaust system with a selective reduction catalyst.

The method of FIG. 4 also provides for an engine operating method, comprising: adjusting a start of injection timing of a fluid being injected to an exhaust system according to an integer multiple of a half period of a pump that is mechanically rotated via an engine. The engine includes where the period of the pump is one revolution of a shaft of the pump. The engine method further comprises opening an injector that injects the fluid for a duration that is less than the half period of the pump. The engine method further comprises not injecting the fluid while injecting fuel to an engine, the exhaust system mechanically coupled to the engine. The engine method includes where the integer multiple is further a function of an engine air flow rate. The engine method includes where an amount of the fluid being injected is a function of a storage capacity of an emissions device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
via a controller,
adjusting a start of injection timing of a fluid according to a half period of a pump that is mechanically rotated via an engine; and
performing a first injection and a second injection based on the start of injection timing for each pump cycle, where the first injection is a higher pressure injection than the second injection.

2. The engine method of claim 1, where the fluid is a hydrocarbon.

3. The engine method of claim 1, where the fluid is a reductant other than a hydrocarbon.

4. The engine method of claim 1, further comprising injecting the fluid into an exhaust system.

5. The engine method of claim 4, further comprising injecting the fluid into the exhaust system upstream of an oxidation catalyst.

6. The engine method of claim 4, further comprising injecting the fluid into the exhaust system upstream of a selective reduction catalyst.

7. The engine method of claim 1, where the engine is a turbo-charged diesel engine that includes an exhaust system with a selective reduction catalyst.

8. An engine system, comprising:
a diesel engine including a compressor;
an exhaust system coupled to the diesel engine, the exhaust system including a catalyst;
a fluid injector positioned upstream of the catalyst in the exhaust system;
a pump mechanically coupled to a shaft of the diesel engine, the pump in fluid communication with the fluid injector; and
a controller including executable instructions stored in non-transitory memory to cause the controller to open the fluid injector for less than a half period of the pump and adjust a start of fluid injection according to a half period of the pump, and to perform a first injection and a second injection for each pump cycle of the pump based on the start of the fluid injection, where the first injection is a higher pressure injection than the second injection.

9. The engine system of claim 8, further comprising additional instruction to adjust the start of fluid injection as a function of an odd integer multiple of the half period of the pump.

10. The engine system of claim 8, where the catalyst is an oxidation catalyst and where the fluid is a hydrocarbon.

11. The engine system of claim 8, where the pump is a belt driven pump, where the catalyst is a selective reduction catalyst, and where the fluid is a reductant other than a hydrocarbon.

12. The engine system of claim 11, where the reductant other than the hydrocarbon is $NH_3$.

13. The engine system of claim 8, where the pump rotates at a speed that is an integer multiple of speed of the engine.

14. The engine system of claim 8, further comprising additional instructions to not open the fluid injector while fuel is being injected to the engine.

15. An engine operating method, comprising:
via a controller,
adjusting a start of injection timing of a fluid being injected to an exhaust system according to an integer multiple of a half period of a pump that is mechanically rotated via an engine; and
performing a plurality of injections based on the start of injection timing,
where the plurality of injections include at least one higher fluid pressure injection and at least one lower fluid pressure injection, and
where each of the at least one lower fluid pressure injections is subsequently followed by one of the at least one higher fluid pressure injections.

16. The engine method of claim 15, where a period of the pump is one revolution of a shaft of the pump.

17. The engine method of claim 15, further comprising opening an injector that injects the fluid for a duration that is less than the half period of the pump.

18. The engine method of claim 15, further comprising not injecting the fluid while injecting fuel to an engine, the exhaust system mechanically coupled to the engine.

19. The engine method of claim 15, where the integer multiple is further a function of an engine air flow rate.

20. The engine method of claim 15, where an amount of the fluid being injected is a function of a storage capacity of an emissions device.

* * * * *